(12) United States Patent
Ron et al.

(10) Patent No.: US 9,857,717 B2
(45) Date of Patent: Jan. 2, 2018

(54) LIQUID ELECTROPHOTOGRAPHIC INK COMPOSITION

(71) Applicant: Hewlett-Packard Indigo B.V., Amstelveen (NL)

(72) Inventors: Hannoch Ron, Kadima (IL); Inna Tzomik, Modiin (IL); Shani Maor, Tel Aviv (IL); Merav Shapira, Yavne (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 15/541,165

(22) PCT Filed: Jan. 20, 2015

(86) PCT No.: PCT/EP2015/051018
§ 371 (c)(1),
(2) Date: Jun. 30, 2017

(87) PCT Pub. No.: WO2016/116142
PCT Pub. Date: Jul. 28, 2016

(65) Prior Publication Data
US 2017/0329249 A1    Nov. 16, 2017

(51) Int. Cl.
*G03G 9/00*     (2006.01)
*G03G 9/13*     (2006.01)
*G03G 15/10*    (2006.01)

(52) U.S. Cl.
CPC ............. *G03G 9/131* (2013.01); *G03G 15/10* (2013.01)

(58) Field of Classification Search
CPC ....................................... G03G 9/131
USPC ....................................... 430/114
See application file for complete search history.

(56) References Cited

U.S. PATENT DOCUMENTS

| | | |
|---|---|---|
| 4,484,970 A | 11/1984 | Burzlaff et al. |
| 5,234,783 A | 8/1993 | Ng |
| 5,407,771 A | 4/1995 | Landa et al. |
| 5,751,432 A | 5/1998 | Gwaltney |
| 5,890,032 A | 3/1999 | Aslam et al. |
| 6,101,345 A | 8/2000 | Van Goethern et al. |
| 6,187,498 B1 | 2/2001 | Knapp et al. |

(Continued)

FOREIGN PATENT DOCUMENTS

| | | |
|---|---|---|
| WO | WO 01/33301 | 5/2001 |
| WO | WO 01/51290 | 7/2001 |

(Continued)

OTHER PUBLICATIONS

"Dynacol 7360", Evonik Industries, Aug. 2013, pp. 1-2 http://coatings.panpage.de/En/Resins/DYNACOLL/DYNACOLL_7360_e.pdf.

(Continued)

*Primary Examiner* — Mark A Chapman
(74) *Attorney, Agent, or Firm* — HP Inc. Patent Department

(57) ABSTRACT

Herein is disclosed a liquid electro photographic (LEP) printing composition comprising: a first resin component comprising an ethylene acrylic acid resin, an ethylene methacrylic acid resin or combinations thereof; and a second resin component present in an amount of about 20% to about 80% by weight of total solids content of the composition, the second resin component having a melting point of from about 50° C. to about 75° C., which is below the melting point of the first resin component, or from about 140° C. to about 180° C., which is above the melting point of the first resin component.

15 Claims, 6 Drawing Sheets

(56) References Cited

U.S. PATENT DOCUMENTS

| | | |
|---|---|---|
| 6,438,336 B1 | 8/2002 | Bengtson |
| 6,466,750 B2 | 10/2002 | McIntyre |
| 6,605,174 B1 | 8/2003 | Landa et al. |
| 6,608,987 B2 | 8/2003 | Bartscher et al. |
| 6,661,993 B2 | 12/2003 | Bartscher et al. |
| 6,795,681 B2 | 9/2004 | Onodera et al. |
| 7,113,718 B2 | 9/2006 | Bobo et al. |
| 7,139,521 B2 | 11/2006 | Ng et al. |
| 7,288,347 B2 | 10/2007 | Sanders et al. |
| 7,509,085 B2 | 3/2009 | Yoshinaga et al. |
| 7,764,894 B2 | 7/2010 | Tamaka |
| 7,773,253 B2 | 8/2010 | Katayanagi |
| 7,783,242 B2 | 8/2010 | Chigono et al. |
| 7,796,145 B2 | 9/2010 | Almog et al. |
| 7,983,581 B2 | 7/2011 | Ishigami et al. |
| 8,180,270 B2 | 5/2012 | Yasutomi et al. |
| 8,244,149 B2 | 8/2012 | Yoshioka |
| 8,311,471 B2 | 11/2012 | Yamada |
| 8,320,812 B2 | 11/2012 | Kanno |
| 8,335,012 B2 | 12/2012 | Iguchi |
| 8,496,998 B2 | 7/2013 | Pickering et al. |
| 8,512,930 B2 | 8/2013 | Chatow et al. |
| 8,588,634 B2 | 11/2013 | Zwartz et al. |
| 8,879,932 B2 | 11/2014 | Okabayashi et al. |
| 2003/0099007 A1 | 5/2003 | Towner et al. |
| 2005/0111891 A1 | 5/2005 | Chen et al. |
| 2005/0135851 A1 | 6/2005 | Ng et al. |
| 2005/0214669 A1 | 9/2005 | Hayashi et al. |
| 2006/0127791 A1 | 6/2006 | Rohde et al. |
| 2010/0071573 A1 | 3/2010 | VanPelt |
| 2011/0008086 A1 | 1/2011 | Matsudaira et al. |
| 2012/0269559 A1 | 10/2012 | Fujita |
| 2012/0321362 A1 | 12/2012 | Hirota |
| 2013/0279958 A1 | 10/2013 | Yukie et al. |
| 2013/0294803 A1 | 11/2013 | Liu et al. |
| 2014/0109828 A1 | 4/2014 | Grinberg |
| 2014/0119752 A1 | 5/2014 | Zaretsky et al. |

FOREIGN PATENT DOCUMENTS

| | | |
|---|---|---|
| WO | WO 01/53895 | 7/2001 |
| WO | WO 2007/130069 | 11/2007 |
| WO | WO 2009/014855 | 1/2009 |
| WO | WO 2009/151446 | 12/2009 |
| WO | WO 2012/105952 | 8/2012 |
| WO | WO 2012/130303 | 10/2012 |
| WO | WO 2012/134457 | 10/2012 |
| WO | WO 2014/079482 | 5/2014 |
| WO | WO 2014/183797 | 11/2014 |
| WO | WO 2014/206494 | 12/2014 |

OTHER PUBLICATIONS

"Safety Data Sheet, A-C 540; 540A; 580; 5120; 5180; OS-540; OS-580", Honeywell, 2015, pp. 1-15.
"REAFREE UV 2335", Coating Resins Arkema Group, 1 pg http://productfinder.arkemacoatingresins.com/coatingsresinsfinder/products/REAFREEUV2335.
"Technical Data Sheet: SMA 1000", Cray Valley USA, Jul. 2010, 1 pg, http://www.crayvalley.com/docs/TDS/sma-1000.pdf.
"DuPont Bynel 2002", Bynel resins Product Data Sheet, DuPont Packaging & Industrial Polymers, 2010, pp. 1-4.
"DuPont Bynel 2022", Bynel resins Product Data Sheet, DuPont Packaging & Industrial Polymers, 2010, pp. 1-4.
"DuPont Fusabond C190", Fusabond resins Product Data Sheet, DuPont Packaging & Industrial Polymers, 2008. pp. 1-2.
"DuPont Nucrel 699", Nucrel resins Product Data Sheet, DuPont Packaging & Industrial Polymers, 2010, pp. 1-3.
"Additives for Adhesives Product Guide", Honeywell Performance Additives, Apr. 2012, pp. 1-2.
"Material Safety Data Sheet SMA 1000P", Cray Valley USA, LLC, Jun. 11, 2010, pp. 1-7.
"Honeywell A-C 5120 Ethylene-Acrylic Acid Copolymer", Honeywell, Jan. 2008, 1 pg https://www.honeywell-additives.com/Additives/TDS/Honeywell-AC5120-tds.pdf.
"Inline Foiler Prindor", Manroland, 2014, pp. 1-2 http://www.manroland.us.com/products/sheetfedoffset/InlineFoiler.htm.
International Search Report and Written Opinion for International Application No. PCT/EP2015/051018 dated Oct. 21, 2015, 9 pages.

LIQUID ELECTROPHOTOGRAPHIC INK COMPOSITION

BACKGROUND

Electrophotographic printing processes, sometimes termed electrostatic printing processes, typically involve creating an image on a photoconductive surface, applying a printing composition having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, a printing composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the carrier liquid, and then to the print substrate.

DETAILED DESCRIPTION

Figure 1:
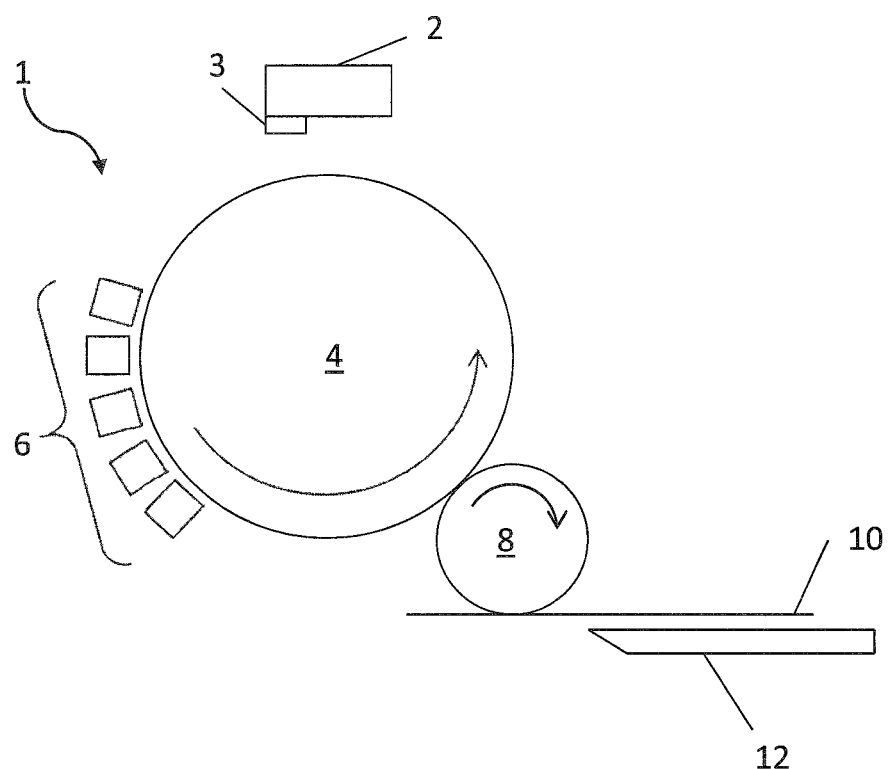
FIG. 1 is a schematic illustration of an example of a Liquid Electro Photographic (LEP) printing apparatus for printing a LEP printing composition.

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which the resins, pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise pigment particles, which may comprise a thermoplastic resin.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer or copolymer is specified, unless otherwise stated, it is the melt flow rate for that polymer or copolymer alone, in the absence of any of the other components of the LEP printing composition.

As used herein, "acidity," "acid number," or "acid value" refers to the mass of potassium hydroxide (KOH) in milligrams that neutralizes one gram of a substance. The acidity of a polymer or copolymer can be measured according to standard techniques, for example as described in ASTM D1386. If the acidity of a particular polymer or copolymer is specified, unless otherwise stated, it is the acidity for that polymer or copolymer alone, in the absence of any of the other components of the LEP printing composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer or copolymer is specified, unless otherwise stated, it is the melt viscosity for that polymer or copolymer alone, in the absence of any of the other components of the LEP printing composition.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/μm, or more, in some examples 600-900 V/μm, or more.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the LEP printing composition, and not including the weight of any carrier fluid present.

As used herein, the term "pigment" is used generally to refer to pigment colorants, magnetic particles, aluminas, silicas, and/or other ceramics or organo-metallics, whether or not such particulates impart color. Thus, though the present description exemplifies, in some examples, the use of pigment colorants, the term "pigment" can be used more generally to describe not just pigment colorants, but other pigments such as organometallics, ferrites, ceramics, etc.

As used herein, the term "coloured" is used to refer to any colour including white and black.

As used herein, the term "coloured toner image" refers to an image formed from an electrostatic ink. An electrostatic ink typically contains a pigment.

An electrostatic ink may be any known electrostatic ink composition comprising a first resin component comprising an ethylene acrylic acid resin, an ethylene methacrylic acid resin or combinations thereof. In some examples the electrostatic ink comprises a first resin component comprising an ethylene acrylic acid resin, an ethylene methacrylic acid resin or combinations thereof and a carrier liquid. In some examples, the electrostatic ink also comprises a colourant. In some examples, the electrostatic ink also comprises a charge director and/or a charge adjuvant. In some examples the first resin component of the electrostatic ink is different to the first resin component of the LEP printing composition. In some examples, the first resin component of the electrostatic ink is the same as to the first resin component of the LEP printing composition. In some examples the electrostatic ink lacks a second resin component. In some examples, the electrostatic ink may be HP Indigo's Electroink®4.5 ink.

In some examples the LEP printing composition differs from the electrostatic ink in that the LEP printing composition lacks a pigment. In some examples the LEP printing composition differs from the electrostatic ink in that the LEP printing composition contains a second resin component and the electrostatic ink lacks a second resin component.

As used herein, the term "melting point" is used to refer to melting points of first and second resin components. The "melting point" of a first or second resin component can be measured using differential scanning calorimetry and may be determined from the first heat flow minima reached on heating the first or second resin component from −50° C. at a rate of 15° C./min. The "melting point" of a first or second resin component can be measured using standard procedures known in the art, for example using the procedure described in ASTM D3418 or the method outlined in the Examples that follow.

As used herein, the terms "partially molten", "partially melt" and "partially melted" are used to refer to an image containing a first and/or a second resin component in which the first or second resin component has been at least partially melted or softened. In the art, this may be determined as when the resin has become tacky. The first resin component or second resin component may become partially molten when heated to a temperature approaching its melting point. For example, an image comprising a first resin component and/or a second resin component may be considered to be at least partially molten when the image has reached a temperature that is about 20° C. or less below the melting point of either the first resin component or the second resin component. In some examples, the image is considered to be at least partially molten when the image has reached a temperature that is about 15° C. or less below the melting point of either the first resin component or the second resin component. In some examples, the image is considered to be at least partially molten when the image has reached a temperature that is about 10° C. or less below the melting point of either the first resin component or the second resin component. In some examples, the image is considered to be at least partially molten when the image has reached a temperature that is about 5° C. or less below the melting point of either the first resin component or the second resin component.

In some examples, an image is considered to be at least partially molten when the image has been held at a temperature approaching the melting point of either the first or second resin component for at least 0.5 seconds, in some examples at least 1 second, in some examples at least 5 seconds, in some examples at least 10 seconds.

The skilled person is able to determine the temperature range at which a first or second resin component will start to soften or partially melt from data obtained from carrying out differential scanning calorimetry (DSC) on a resin sample using the procedure described in ASTM D3418 showing heat flow to the sample over a temperature range covering the melting point of the resin component. A graph showing the heat flow to the sample against temperature obtained by DSC will show a broad trough for the melting point of the resin. As the skilled person understands, at temperatures below the melting point of the resin, determined as described above, but still within the broad trough the resin will be softened or partially molten.

Unless otherwise stated, any feature described herein can be combined with any aspect or any other feature described herein.

In an aspect, there is provided a liquid electro photographic (LEP) printing composition comprising a first resin component and a second resin component, wherein the melting point of the second resin component is either below the melting point of the first resin component or above the melting point of the first resin component.

In an aspect there is provided a liquid electro photographic (LEP) printing composition. The LEP printing composition may comprise:
- a first resin component comprising an ethylene acrylic acid resin, an ethylene methacrylic acid resin or combinations thereof; and
- a second resin component present in an amount of about 20% to about 80% by weight of total solids content of the composition, the second resin component having a melting point of from about 50° C. to about 75° C., which is below the melting point of the first resin component, or from about 140° C. to about 180° C., which is above the melting point of the first resin component.

First Resin Component

The first resin component may comprise an ethylene acrylic acid resin, an ethylene methacrylic acid resin or combinations thereof. The ethylene acrylic acid resins and the ethylene methacrylic acid resins may also be described as ethylene acrylic acid copolymers and ethylene methacrylic acid copolymers. In some examples, the ethylene acrylic acid resin and the ethylene methacrylic acid resin may contain 80 wt % to 99.9 wt % of ethylene and 0.1 wt % to 20 wt % of acrylic or methacrylic acid.

In some examples, the first resin component has a melting point within the range of from about 80° C. to about 120° C., in some examples from about 90° C. to about 110° C. In some examples, the first resin component has a melting point within the range of from about 80° C. to about 100° C. The melting point of a resin component can be measured using standard procedures known in the art, for example using the procedure described in ASTM D3418.

Ethylene acrylic acid copolymers and ethylene methacrylic acid copolymers contain acidic side groups. The first resin component may contain copolymers having an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The first resin component containing a resin having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a resin, as measured in mg KOH/g can be measured using standard procedures known in the art, for example using the procedure described in ASTM D1386.

The first resin component comprising an ethylene acrylic acid copolymer and/or an ethylene methacrylic acid copolymer having acidic side groups, may have a melt flow rate of less than about 120 g/10 minutes, in some examples about 110 g/10 minutes or less, in some examples about 100 g/10 minutes or less, in some examples about 90 g/10 minutes or less, in some examples about 80 g/10 minutes or less, in some examples about 70 g/10 minutes or less, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less.

The first resin component containing an ethylene acrylic acid copolymer and/or an ethylene methacrylic acid copolymer having acidic side groups, may have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The ethylene acrylic acid copolymer and/or the ethylene methacrylic acid copolymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The first resin component selected from ethylene acrylic acid resins, ethylene methacrylic acid resins or combinations thereof may have acidic sides groups which are at least partially neutralized with metal ions (e.g. Zn, Na, Li) such as SURLYN® ionomers. The ethylene acrylic acid copolymers and ethylene methacrylic acid copolymers may be such that either the acrylic or methacrylic acid constitute from 5 wt % to about 25 wt % of the ethylene acrylic acid or ethylene methacrylic acid co-polymer, in some examples from 10 wt % to about 20 wt % of the ethylene acrylic acid or ethylene methacrylic acid co-polymer.

The first resin component may include two different ethylene acrylic acid and/or ethylene methacrylic acid copolymers having acidic side groups. The two copolymers having acidic side groups may have different acidities, which may fall within the ranges mentioned above. The resin may include a first copolymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second copolymer having acidic side groups that has an acidity of 110 mg KOH/g to 130 mg KOH/g. In some examples, the first copolymer may be Nucrel 699® (from DuPont). In some examples, the second copolymer may be A-C® 5120 (from Honeywell).

The ratio of the first copolymer having acidic side groups to the second copolymer having acidic side groups can be from about 10:1 to about 2:1. The ratio can be from about 6:1 to about 3:1, in some examples about 4:1.

The first resin component may include an ethylene acrylic acid and/or an ethylene methacrylic acid copolymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said copolymer may be an ethylene acrylic acid and/or an ethylene methacrylic acid copolymer having acidic side groups as described herein. The first resin component may include a first copolymer having a melt viscosity of 15000 poise or more, in some examples 20000 poise or more, in some examples 50000 poise or more, in some examples 70000 poise or more; and in some examples, the resin may include a second copolymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first copolymer having a melt viscosity of more than 60000 poise, in some examples from 60000 poise to 100000 poise, in some examples from 65000 poise to 85000 poise; a second copolymer having a melt viscosity of from 15000 poise to 40000 poise, in some examples 20000 poise to 30000 poise, and a third copolymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first copolymer is Nucrel® 960 (from DuPont), and example of the second copolymer is Nucrel® 699 (from DuPont), and an example of the third copolymer is A-C® 5120 or A-C® 5180 (from Honeywell). The first, second and third copolymers may be selected from ethylene acrylic acid and/or ethylene methacrylic acid copolymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the first resin component in the LEP printing composition includes a single type of ethylene acrylic acid or ethylene methacrylic acid copolymer, the copolymer (excluding any other components of the LEP printing composition) may have a melt viscosity of 6000 poise or more, in some examples a melt viscosity of 8000 poise or more, in some examples a melt viscosity of 10000 poise or more, in some examples a melt viscosity of 12000 poise or more. If the first resin component includes a plurality of ethylene acrylic acid and/or ethylene methacrylic acid copolymers all the copolymers of the first resin component may together form a mixture (excluding any other components of the LEP printing composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The first resin component may include two different copolymers having acidic side groups that are selected from co-polymers of ethylene and an ethylenically unsaturated acid of either acrylic acid or methacrylic acid; or an ionomer of ethylene methacrylic acid copolymer or an ionomer of ethylene acrylic acid copolymer which are at least partially neutralized with metal ions (e.g. Zn, Na, Li) such as SUR-LYN® ionomers. The first resin component may include (i) a first copolymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second copolymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The first resin component may comprise an ethylene acrylic acid resin and an ethylene methacrylic acid resin. In some examples, the ratio by weight of the ethylene acrylic acid resin to the ethylene methacrylic acid resin in the first resin component is from about 5:95 to about 30:70.

The first resin component may comprise an ethylene acrylic acid and/or an ethylene methacrylic acid copolymer having acidic side groups, as described above, and a polymer having ester side groups.

The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel® 2022 and Bynel® 2002, which are available from DuPont®.

The polymer having ester side groups may constitute 1% or more by weight of the total amount of the first resin component in the LEP printing composition and/or the printing composition printed on the print substrate. The polymer having ester side groups may constitute 5% or more by weight of the total amount of the first resin component polymers, in some examples 8% or more by weight of the total amount of the first resin component polymers, in some examples 10% or more by weight of the total amount of the first resin component polymers, in some examples 15% or more by weight of the total amount of the first resin component polymers, in some examples 20% or more by weight of the total amount of the first resin component polymers, in some examples 25% or more by weight of the total amount of the first resin component polymers, in some examples 30% or more by weight of the total amount of the first resin component polymers, in some examples 35% or more by weight of the total amount of the first resin component polymers in the LEP printing composition and/or the LEP printing composition printed on the print substrate. The polymer having ester side groups may constitute from 5% to 50% by weight of the total amount of the first resin component polymers in the LEP printing composition and/or the LEP printing composition printed on the print substrate, in some examples 10% to 40% by weight of the total amount of the first resin component polymers in the LEP printing composition and/or the LEP printing composition printed on the print substrate, in some examples 5% to 30% by weight of the total amount of the first component resin polymers in the LEP printing composition and/or the LEP printing composition printed on the print substrate, in some examples 5% to 15% by weight of the total amount of the first resin component polymers in the LEP printing composition and/or the LEP printing composition printed on the print substrate in some examples 15% to 30% by weight of the total amount of the first component resin polymers in the LEP printing composition and/or the LEP printing composition printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the first resin component can in some examples be selected from the Nucrel® family of resins (e.g. Nucrel® 403, Nucrel® 407, Nucrel® 609HS, Nucrel® 908HS, Nucrel® 1202HC, Nucrel® 30707, Nucrel® 1214, Nucrel® 903, Nucrel® 3990, Nucrel® 910, Nucrel® 925, Nucrel® 699, Nucrel® 599, Nucrel® 960, Nucrel® RX 76, Nucrel® 2806, Bynell® 2002, Bynell® 2014, Bynell® 2020 and Bynell® 2022, (sold by E. I. DuPont)), the A-C® family of resins (e.g. A-C® 5120, A-C® 5180, A-C® 540, A-C® 580 (sold by Honeywell)), the Aclyn® family of resins (e.g. Aclyn® 201, Aclyn® 246, Aclyn® 285, and Aclyn® 295), and the Lotader® family of resins (e.g. Lotader® 2210, Lotader® 3430, and Lotader® 8200 (sold by Arkema)).

Second Resin Component

The second resin component has a melting point which is above or below the melting point of the first resin component. In examples, the melting point of the second resin component is significantly above or below the melting point of the first resin component, for example, the melting point of the second resin component may be at least 10° C. lower or at least 10° C. higher than the melting point of the first resin component.

In some examples the melting point of the second resin component is significantly below the melting point of the first resin component, for example, the melting point of the second resin component may be at least 10° C. lower than the melting point of the first resin component, in some examples the melting point of the second resin component is at least 15° C. lower than the melting point of the first resin component, in some examples the melting point of the second resin component is at least 20° C. lower than the melting point of the first resin component, in some examples the melting point of the second resin component is at least 25° C. lower than the melting point of the first resin component, in some examples the melting point of the second resin component is at least 30° C. lower than the melting point of the first resin component.

In some examples the melting point of the second resin component is significantly above the melting point of the first resin component, for example, the melting point of the second resin component may be at least 10° C. higher than the melting point of the first resin component, in some examples the melting point of the second resin component is at least 15° C. higher than the melting point of the first resin component, in some examples the melting point of the second resin component is at least 20° C. higher than the melting point of the first resin component, in some examples the melting point of the second resin component is at least 25° C. higher than the melting point of the first resin component, in some examples the melting point of the second resin component is at least 30° C. higher than the melting point of the first resin component, in some examples the melting point of the second resin component is at least 35° C. higher than the melting point of the first resin component, in some examples the melting point of the second resin component is at least 40° C. higher than the melting point of the first resin component, in some examples the melting point of the second resin component is at least 45° C. higher than the melting point of the first resin component, in some examples the melting point of the second resin component is at least 50° C. higher than the melting point of the first resin component.

The LEP printing composition may comprise a second resin component in an amount of about 20% to about 80% by weight of total solids content of the composition. The second resin component may have a melting point of either from about 50° C. to about 75° C., which is below the melting point of the first resin component, or from about 140° C. to about 180° C., which is above the melting point of the first resin component.

In some examples, the second resin component is present in the LEP printing composition in an amount of at least 40% by weight of total solids content of the composition, in some examples the second resin component is present in the LEP printing composition in an amount of at least 45% by weight of total solids content of the composition, in some examples the second resin component is present in the LEP printing composition in an amount of at least 50% by weight of total solids content of the composition, in some examples the second resin component is present in the LEP printing composition in an amount of at least 55% by weight of total solids content of the composition, in some examples the second resin component is present in the LEP printing composition in an amount of at least 60% by weight of total solids content of the composition.

In some examples, the second resin component has a melting point of from about 50° C. to about 75° C., which is below the melting point of the first resin component, in some examples, the second resin component has a melting point of from about 50° C. to about 70° C., which is below the melting point of the first resin component.

In some examples, the second resin component has a melting point of from about 140° C. to about 180° C., which is above the melting point of the first resin component, in some examples, the second resin component has a melting point of from about 150° C. to about 170° C., which is above the melting point of the first resin component.

In some examples, the second resin component is transparent.

In some examples, the second resin component comprises a urethane acrylate, a copolyester, an ethylene vinyl acetate or a styrene maleic anhydride resin.

In some examples, the second resin component with a melting point below the melting point of the first resin component comprises a urethane acrylate, a copolyester or an ethylene vinyl acetate resin.

In some examples the urethane acrylate is an aliphatic urethane acrylate, and in some examples a semi-crystalline aliphatic urethane acrylate. In some examples, the urethane acrylate resin can be Reafree® UV 2335 (sold by Arkema).

In some examples the copolyester is a saturated copolyester, and in some examples a partially crystalline saturated copolyester. In some examples, the copolyester resin can be Dynacoll® 7360 (sold by Evonik industries).

In some examples the ethylene vinyl acetate resin is an anhydride modified ethylene vinyl acetate copolymer. In some examples, the ethylene vinyl acetate resin can be Fusabond® C190 (sold by DuPont).

In some examples, the second resin component with a melting point above the melting point of the first resin component is a styrene maleic anhydride copolymer. In some examples, the styrene maleic anhydride copolymer can be SMA® 1000p (sold by Cray Valley).

In some examples, the second resin component is not substantially swellable in a carrier liquid, for example, the second resin component may not be substantially swellable in a carrier liquid such as Isopar-L™ (sold by Exxon Corporation).

In some examples, the second resin component has a swelling index of less than 20% in a carrier liquid. In some examples, the second resin component has a swelling index of less than 15% in a carrier liquid, in some examples the second resin component has a swelling index of less than 10% in a carrier liquid. In some examples the second resin component has a swelling index of less than 8% in a carrier liquid, in some examples the second resin component has a swelling index of less than 6% in a carrier liquid, in some examples the second resin component has a swelling index of less than 4% in a carrier liquid, in some examples the second resin component has a swelling index of less than 2% in a carrier liquid, in some examples the second resin component has a swelling index of less than 1% in a carrier liquid. The swelling index of the second resin component can be measured using standard procedures known in the art, for example by measuring the weight of a sample of a second resin component before placing in a carrier liquid ($W_2$), then leaving the sample of the second resin component in the carrier liquid for 7 days at 45° C., then removing the samples from the carrier liquid and gently wiping the samples with a fibreglass rag to remove any excess carrier liquid on the surface of the sample before being reweighed ($W_1$). The swelling index in the carrier liquid can then be calculated using the following equation:

$$\text{Swelling Index in carrier liquid} = (W_1 - W_2)/W_2 \times 100\%$$

Carrier Liquid

The LEP printing composition may further comprise a carrier liquid. In some examples, the first and second resin components may be dispersed in the carrier liquid.

An electrostatic ink described herein may comprise a carrier liquid.

The carrier liquid can include or be a hydrocarbon, silicone oil, vegetable oil, etc. The carrier liquid can include, but is not limited to, an insulating, non-polar, non-aqueous liquid that can be used as a medium for the first and second resin components. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid can constitute about 20% to 99.5% by weight of the LEP printing composition, in some examples 50% to 99.5% by weight of the LEP printing composition. The carrier liquid may constitute about 40 to 90% by weight of the LEP printing composition. The carrier liquid may constitute about 60% to 80% by weight of the LEP printing composition. The carrier liquid may constitute about 90% to 99.5% by weight of the LEP printing composition, in some examples 95% to 99% by weight of the LEP printing composition.

The LEP printing composition, when printed on a print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the printing composition printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the printing composition printed on the print substrate is free from carrier liquid.

Charge Director and Charge Adjuvant

The LEP printing composition may include a charge director.

An electrostatic ink described herein may comprise a charge director.

The charge director may be added to a LEP printing composition or an electrostatic ink in order to impart and/or maintain sufficient electrostatic charge on particles contained in the LEP printing composition or the electrostatic ink.

In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the LEP printing composition or the particles of an electrostatic ink. In some examples, the charge director imparts a positive charge on the particles of the LEP printing composition or the particles of an electrostatic ink. In some examples, the charge director comprises a phospholipid, in some examples a salt or an alcohol of a phospholipid. In some examples, the charge director comprises species selected from a phosphatidylcholine and derivatives thereof.

In some examples, the charge director includes a sulfosuccinate moiety of the general formula [$R_{1'}$—O—C(O)CH$_2$CH(SO$_3^-$)C(O)—O—$R_{2'}$], where each of $R_1'$ and $R_2'$ is an alkyl group. In some examples, the charge director includes nanoparticles of a simple salt and a sulfosuccinate salt of the general formula MAn, wherein M is a metal, n is the valence of M, and A is an ion of the general formula [$R_{1'}$—O—C(O)CH$_2$CH(SO$_3^-$)C(O)—O—$R_{2'}$], where each of $R_{1'}$ and $R_{2'}$ is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of SO$_4^{2-}$, PO$^{3-}$, NO$^{3-}$, HPO$_4^{2-}$, CO$_3^{2-}$, acetate, trifluoroacetate (TFA), Cl$^-$, BF$_4^-$, F–, ClO$_4^-$, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)3, LiClO$_4$ and LiBF$_4$, or any sub-group thereof. The charge director may further include basic barium petronate (BBP).

In the formula [$R_{1'}$—O—C(O)CH$_2$CH(SO$_3^-$)C(O)—O—$R_{2'}$], in some examples each of $R_{1'}$ and $R_{2'}$ is an aliphatic alkyl group. In some examples, each of $R_{1'}$ and $R_{2'}$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is C13H27. In some examples, M is Na, K, Cs, Ca, or Ba. The formula [$R_{1'}$—O—C(O)CH$_2$CH(SO$_3^-$)C(O)—O—$R_{2'}$] and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20% by weight, in some examples 0.01% to 20% by weight, in some examples 0.01 to 10% by weight, in some examples 0.01% to 1% by weight of the solids of an LEP printing composition. In some examples, the charge director constitutes about 0.001% to 0.15% by weight of the solids of the LEP printing composition, in some examples 0.001% to 0.15%, in some examples 0.001% to 0.02% by weight of the solids of an LEP printing composition, in some examples 0.1% to 2% by weight of the solids of the LEP printing composition, in some examples 0.2% to 1.5% by weight of the solids of the LEP printing composition, in some examples 0.1% to 1% by weight of the solids of the LEP printing composition, in some examples 0.2% to 0.8% by weight of the solids of the LEP printing composition. In some examples, the charge director is present in an amount of at least 1 mg of charge director per gram of solids of the LEP printing composition (which will be abbreviated to mg/g), in some examples at least 2 mg/g, in some examples at least 3 mg/g, in some examples at least 4 mg/g, in some examples at least 5 mg/g. In some examples, the moderate acid is present in the amounts stated above, and the charge director is present in an amount of from 1 mg to 50 mg of charge director per gram of solids of the LEP printing composition (which will be abbreviated to mg/g), in some examples from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

The LEP printing composition may include a charge adjuvant.

An electrostatic ink may include a charge adjuvant.

A charge adjuvant may promote charging of the particles when a charge director is present.

In a method of producing a LEP printing composition as described herein a charge adjuvant, if added, may be added at any stage.

The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In some examples, the charge adjuvant is aluminium di or tristearate.

The charge adjuvant may be present in an amount of about 0.1 to 5% by weight, in some examples about 0.1 to 1% by weight, in some examples about 0.3 to 0.8% by weight of the solids of the LEP printing composition, in some examples about 1 wt % to 3 wt % of the solids of the LEP printing composition, in some examples about 1.5 wt % to 2.5 wt % of the solids of the LEP printing composition.

In some examples, the LEP printing composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the LEP printing composition, in some examples in an amount of 0.1 wt % to 2 wt % of the solids of the LEP printing composition, in some examples in an amount of 0.1 wt % to 2 wt % of the solids of the LEP printing composition, in some examples in an amount of 0.3 wt % to 1.5 wt % of the solids of the LEP printing composition, in some examples about 0.5 wt % to 1.2 wt % of the solids of the LEP printing composition, in some examples about 0.8 wt % to 1 wt % of the solids of the LEP printing composition, in some examples about 1 wt % to 3 wt % of the solids of the LEP printing composition, in some examples about 1.5 wt % to 2.5 wt % of the solids of the LEP printing composition.

The charge adjuvant may be termed a grinding aid.

None of the types of charge director and charge adjuvant, for the purposes of this disclosure, constitute a pigment.

Colorant

In some examples, the LEP printing composition lacks a colorant. In some examples, the LEP printing composition lacks inorganic particulate material. In some examples, the LEP printing composition or the electrostatic ink is substantially transparent when printed.

In some examples, the LEP printing composition may be a substantially colorless, clear or transparent composition substantially free from pigment. In examples in which the LEP printing compositions are substantially free from pigment, they may be used as glosses, gloss inhibitors and adhesives in the methods described herein without contributing a further subtractive effect on the CMYK inks that would substantially affect the color of an underprinted colored image.

As used herein, "substantially free from pigment" is used to describe a LEP printing composition in which less than 1 wt % of the solids in the LEP printing composition are made up of colorant, in some examples less than 0.5 wt % of the solids in the LEP printing composition are made up of colorant, in some examples less than 0.1 wt % of the solids in the LEP printing composition are made up of colorant, in some examples less than 0.05 wt % of the solids in the LEP printing composition are made up of colorant, in some examples less than 0.01 wt % of the solids in the LEP printing composition are made up of colorant.

In some examples, the LEP printing composition, either before or after having been printed on a print substrate, may include a colorant.

An electrostatic ink may comprise a colorant.

In some examples, the first and/or second resin components may further include a colorant.

The colorant may be selected from a pigment, dye and a combination thereof. The colorant may be transparent, unicolor or composed of any combination of available colours. The colorant may be selected from a white colorant, a cyan colorant, a yellow colorant, a magenta colorant and a black colorant. The LEP printing composition may include a plurality of colorants. The LEP printing composition may include a first colorant and second colorant, which are different from one another. Further colorants may also be present with the first and second colorants. The LEP printing composition may include first and second colorants where each are independently selected from a white colorant, a cyan colorant, a yellow colorant, a magenta colorant and a black colorant. In some examples, the first colorant includes a black colorant, and the second colorant includes a non-black colorant, for example a colorant selected from a white colorant, a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

The colorant may include a pigment. The pigments can be any pigment compatible with the liquid carrier and useful for electrostatic printing. For example, the pigment may be present as pigment particles, or may include a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of TiO$_2$, calcium carbonate, zinc oxide, and mixtures thereof. In some examples the white pigment particle may comprise an alumina-TiO$_2$ pigment.

Other Additives

The LEP printing composition may include an additive or a plurality of additives. The additive or plurality of additives may be added at any stage of producing the LEP printing composition. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the LEP printing composition to a print substrate during printing of the LEP printing composition Method of Producing a LEP Printing Composition In an aspect, there is also provided, a method of producing a liquid electro photographic (LEP) printing composition. The method of producing a LEP printing composition may comprise combining a carrier liquid, a first resin component comprising an ethylene acrylic acid resin, an ethylene methacrylic acid resin or combinations thereof, and about 20% to about 80% by weight of total solids content of the composition of a second resin component having a melting point of from about 50° C. to about 75° C., which is below the melting point of the first resin component, or from about 140° C. to about 180° C., which is above the melting point of the first resin component.

In some examples, the first resin component and the second resin component are ground together with a carrier liquid. In some examples a grinding aid, such as aluminium stearate is added to aid grinding.

In some examples, the ground mixture is diluted by the addition of further carrier liquid to form the LEP printing composition.

In some examples, a charge director is added to the LEP printing composition. The charge director may be added to the LEP printing composition before or after grinding.

Method of Electrophotographic Printing a LEP Printing Composition

In an aspect, there is also provided, a method of electrophotographic printing a liquid electro photographic (LEP) printing composition, the composition comprising:

a first resin component comprising an ethylene acrylic acid resin, an ethylene methacrylic acid resin or combinations thereof;

a second resin component present in an amount of about 20% to about 80% by weight of total solids content of the composition, the second resin component having a melting point of from about 50° C. to about 75° C., which is below the melting point of the first resin component, or from about 140° C. to about 180° C., which is above the melting point of the first resin component; and a carrier liquid. The method may comprise:

forming a latent electrostatic image on a surface;

contacting the surface with the LEP printing composition such that at least some of the LEP printing composition adheres to the surface to form an image on the surface; and transferring the image to a print substrate.

In some examples, the method of electrophotographic printing a LEP printing composition further comprises heating the print substrate to at least partially melt the first resin component or the second resin component of the LEP printing composition without melting the other of the first resin component or the second resin component to form a partially molten image on the print substrate.

In some examples, the print substrate is heated to a temperature in the range of from about 70° C. to about 120° C. to at least partially melt the first or second resin component, in some examples the print substrate is heated to a temperature in the range of from of about 70° C. to about 90° C. to at least partially melt the first or second resin component.

In some examples, the method of electrophotographic printing a LEP printing composition further comprising applying pressure to the partially molten image on the print substrate to form a glossed image on the print substrate. In some examples, a smoothing film, for example a polymeric film such as a polyester film or a polyester metalized film, or a Teflon® based film, is applied to the partially molten image to aid formation of a glossed LEP printing composition image. In some examples the polymeric film has a thickness of 200 μm or less, in some examples the polymeric film has a thickness of 100 μm or less, in some examples the polymeric film has a thickness of 50 μm or less.

In some examples, the method of electrophotographic printing also comprises removing the smoothing film from the print substrate after a glossed image has been formed.

In some examples, the method of electrophotographic printing a LEP printing composition further comprising applying pressure and a foiling material to the partially molten image on the print substrate such that the foiling material adheres to the partially molten image to form a foiled image on the print substrate.

In some examples the foiling material is a metallic material. In some examples the foiling material has a thickness of 200 μm or less, in some examples the foiling material has a thickness of 100 μm or less, in some examples the foiling material has a thickness of 50 μm or less, in some examples the foiling material has a thickness of 25 μm or less. In some examples, the foiling material is applied to a polymeric film such as a polyester film or a Teflon® based film before being applied to the print substrate to aid application of the foiling material to the print substrate. In some examples, after foiling, the foiling film is removed from the print substrate to leave behind a foiled image.

In examples in which the LEP printing composition comprises a second resin component having a melting point lower than the first resin component the LEP printing composition may be an adhesive LEP printing composition or a glossing LEP printing composition.

In examples in which the LEP printing composition comprises a second resin component having a melting point higher than the first resin component the LEP printing composition may be a gloss inhibiting or a matt LEP printing composition.

In some examples, the LEP printing composition is printed on a coloured image disposed on the print substrate to form a LEP printing composition image disposed on a coloured image. In some examples the coloured image is an image formed by electrostatically printing an electrostatic ink comprising a first resin component comprising an ethylene acrylic acid resin, an ethylene methacrylic acid resin or combinations thereof.

In some examples, the method of printing a LEP printing composition also comprises printing a coloured image on a print substrate by electrostatically printing an electrostatic ink composition comprising a first resin component comprising an ethylene acrylic acid resin, an ethylene methacrylic acid resin or combinations thereof and a carrier liquid to provide a print substrate comprising a coloured image and a LEP printing composition image disposed on the coloured image.

In some examples, the coloured image and/or the electrostatic ink lacks a second resin component. In some examples, the first resin component of the coloured image is different to the first resin component of the LEP printing composition. In some examples, the first resin component of the coloured image is the same as the first resin component of the LEP printing composition.

In some examples, the difference in gloss between a coloured image and a LEP printing composition image on a print substrate after applying pressure to a print substrate comprising a partially molten coloured image and/or a partially molten LEP printing composition image is at least 10 gloss units (GU), in some examples, at least 15 gloss units (GU), in some examples at least 20 gloss units (GU), in some examples at least 25 gloss units (GU), in some examples at least 30 gloss units (GU), in some examples at least 35 gloss units (GU), in some examples least 40 gloss units (GU) as determined at 60° using a glossmeter (for example, "micro-Tri-gloss" supplied by BYK Gardner Gmbh, Germany).

FIG. 1 shows a schematic illustration of a Liquid Electro Photographic (LEP) printing apparatus which may be used to print a LEP printing composition comprising a carrier liquid. An image, including any combination of graphics, text and images, may be communicated to the LEP printing apparatus 1. According to an illustrative example, in order to print the LEP printing composition, firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. The LEP printing composition is then transferred to the photo-imaging cylinder 4 by Binary Ink Developer (BID) units 6. The BID units 6 present a uniform film of LEP printing composition to the photo-imaging cylinder 4. The LEP printing composition contains an electrically charged first resin component which, by virtue of an appropriate potential on the electrostatic image areas, is attracted to the latent electrostatic image on the photo-imaging cylinder 4 (first transfer). The LEP printing composition does not adhere to the uncharged, non-image areas and forms an image on the surface of the latent electrostatic image. The photo-imaging cylinder 4 then has a LEP printing composition image on its surface.

The image is then transferred from the photo-imaging cylinder 4 to the intermediate transfer member (ITM) 8 by virtue of an appropriate potential applied between the photo-imaging cylinder 4 and the ITM 8, such that the charged LEP printing composition is attracted to the ITM 8 (second transfer). The image is then dried and fused on the ITM 8 before being transferred to a print substrate 10 fed to the ITM 8 from a print substrate input station 12.

Between the first and second transfers the solid content of the LEP printing composition image is increased and the LEP printing composition is fused on to the ITM 8. For example, the solid content of the LEP printing composition image deposited on the ITM 8 after the first transfer is typically around 20%, by the second transfer the solid content of the image is typically around 80-90%. This drying and fusing is typically achieved by using elevated temperatures and air flow assisted drying. In some examples, the ITM 8 is heatable.

In some examples, one of the BID units 6 of the LEP printing apparatus 1 comprises a LEP printing composition reservoir containing a LEP printing composition and the remaining BID units 6 comprise coloured toner reservoirs each containing a coloured toner being an electrostatic ink comprising a first resin component comprising an ethylene acrylic acid resin, an ethylene methacrylic acid resin or combinations thereof.

An LEP printing composition image disposed on a coloured toner image disposed on the print substrate may be obtained in one pass of the print substrate 10 through the LEP printing apparatus 1 or in multiple passes of the print substrate 10 through the LEP printing apparatus 1.

In examples in which the LEP printing composition image disposed on a coloured toner image disposed on the print substrate is obtained in one pass of the print substrate 10 through the LEP printing apparatus 1, after forming the latent electrostatic image on the surface of the photo-imaging cylinder 4, the LEP printing composition is transferred from the LEP printing composition reservoir of the BID units 6 to the photo-imaging cylinder 4 by electrical forces to form a LEP printing composition image on the photo-imaging cylinder 4. In this one pass method, the LEP printing composition image is then transferred from the photo-imaging cylinder 4 to the ITM 8. A second latent electrostatic image is then formed on the surface of the photo-imaging cylinder 4 and a coloured toner image is then formed on the surface of the photo-imaging cylinder 4. The coloured toner image is then transferred from the surface of the photo-imaging cylinder 4 to the ITM 8 to form a first coloured toner image disposed on the LEP printing composition image on the ITM 8. Subsequent coloured toner images are then formed on top of the first coloured toner image disposed on the LEP printing composition image on the ITM 8 before transfer of the LEP printing composition image and the coloured toner images from the ITM 8 to the print substrate. On transfer of the images to the print substrate a LEP printing composition image is disposed on the coloured toner images which are in turn disposed on the print substrate.

In examples in which the LEP printing composition image disposed on a coloured toner image disposed on the print substrate is obtained in multiple passes of the print substrate 10 through the LEP printing apparatus 1, the first image formed on the photo-imaging cylinder 4 and transferred to the print substrate 10 via the ITM 8 is a coloured toner image. The print substrate 10 then undergoes additional passes through the LEP printing apparatus 1 for each additional coloured toner image applied to the print substrate 10. After each of the coloured toner images have been applied to the print substrate, the LEP printing composition is transferred from the LEP printing composition reservoir of the BID units 6 to the photo-imaging cylinder 4 by electrical forces to form a LEP printing composition image on the photo-imaging cylinder 4. The LEP printing composition image is then transferred form the photo-imaging cylinder 4 to the print substrate 10 via the ITM 8 to form a LEP printing composition image disposed on the coloured toner images disposed on the print substrate 10.

EXAMPLES

The following illustrates examples of the methods and other aspects described herein. Thus, these Examples should not be considered as limitations of the present disclosure, but are merely in place to teach how to make examples of the present disclosure.

LEP Printing Compositions

In the Examples below "Electroink 4.5 paste" is used to describe a paste comprising 25 wt % of a first resin component, the first resin component being 20 wt % A-C® 5120 and 80 wt % Nucrel® 699, and 75 wt % Isopar L as a carrier liquid. Electroink 4.5 paste lacks a pigment.

Example 1

A LEP printing composition was prepared by combining 61.6 g of Electroink 4.5 paste containing 15.4 g of a first resin component containing an ethylene acrylic acid copolymer and an ethylene methacrylic acid copolymer in 46.2 g of a carrier liquid (Isopar L (sold by ExxonMobil)) with 24 g of a second resin component containing an aliphatic urethane acrylate. In this example, the first resin component contained A-C® 5120 (sold by Honeywell) as the ethylene acrylic acid copolymer and Nucrel® 699 (sold by DuPont) as the ethylene methacrylic acid in a ratio of 20:80 A-C® 5120 to Nucrel® 699. The aliphatic urethane used as the second resin component in this example was Reafree® UV 2335 (sold by Arkema).

0.6 g of grinding aid material aluminium stearate (sold by Aldrich) and 113.8 g of Isopar L (sold by ExxonMobil) as a carrier liquid were added to the first and second resin components.

The materials were ground using a 01HD attritor from Union Process (USA) at 25° C. for 24 hours. The LEP printing composition was diluted by adding a carrier liquid Isopar L to form a composition having about 6 wt % solids by total weight of the composition. The composition was then charged by adding a charge director, 8 g of Imaging Agent (from HP was added as the charge director per 500 g of diluted composition.

Example 2

This example was prepared in the same way as Example 1, with the exception that the second resin component used was a saturated copolyester. In this example, the saturated copolyester used was Dynacoll® 7360 (sold by Evonik industries).

Example 3

This example was prepared in the same way as Example 1, with the exception that the second resin component used was an anhydride modified ethylene vinyl acetate copolymer. In this example, the anhydride modified ethylene vinyl acetate copolymer used was Fusabond® 0190 (sold by DuPont).

Example 4

This example was prepared in the same way as Example 2, with the exception that 22.8 g of Dynacoll® 7360 (sold by Evonik industries) was added as the second resin component, and 1.2 g 1,2,4,5-Benzenetetracarboxylic acid (sold by Sigma) was added in addition to the grinding aid and the carrier liquid before grinding.

Example 5

A LEP printing composition was prepared by combining 77.6 g of Electroink 4.5 paste which contained 19.4 g of a first resin component containing an ethylene acrylic acid copolymer and an ethylene methacrylic acid copolymer in 58.2 g of a carrier liquid (Isopar L (sold by ExxonMobil)) with 20 g of a second resin component containing a styrene maleic anhydride copolymer. In this example, the first resin component contained A-C® 5120 (sold by Honeywell) as the ethylene acrylic acid copolymer and Nucrel® 699 (sold by DuPont) as the ethylene methacrylic acid in a ratio of 20:80 A-C® 5120 to Nucrel® 699. The styrene maleic anhydride copolymer used as the second resin component in this example was SMA® 1000p (sold by Cray Valley).

0.6 g of grinding aid material aluminium stearate (sold by Aldrich) and 101.8 g of Isopar L (sold by ExxonMobil) as a carrier liquid were added to the first and second resin components.

The materials were ground using a 01HD attritor from Union Process (USA) at 25° C. for 24 hours. The LEP printing composition was diluted by adding a carrier liquid Isopar L to form a composition having about 6 wt % solids by total weight of the composition. The composition was then charged by adding a charge director, 8 g of Imaging Agent (from HP) was added as the charge director per 500 g of diluted composition.

The melting points of the first and second resin components used in Examples 1-5 were determined using differential scanning calorimetry (DSC). The instrument used was a TA instruments Discovery model. Sample sizes of the first and second resin components and the LEP printing compositions used were 0.9 to 1.3 mg. The measurement protocol included three successive scans at a rate of 15° C./min under a nitrogen atmosphere. For the first resin component and the second resin components used in Examples 1-4, the first scan was from −50° C. to 150° C., the second scan was from 150° C. to −50° C., and the third scan was from −50° C. to 150° C. For the second resin component used in Example 5, the first scan was from −50° C. to 200° C., the second scan was from 200° C. to −50° C., and the third scan was from −50° C. to 200° C. As the sample was heated across the temperature range in the third scan the changes in heat flow to the sample were recorded.

Figure 2A:
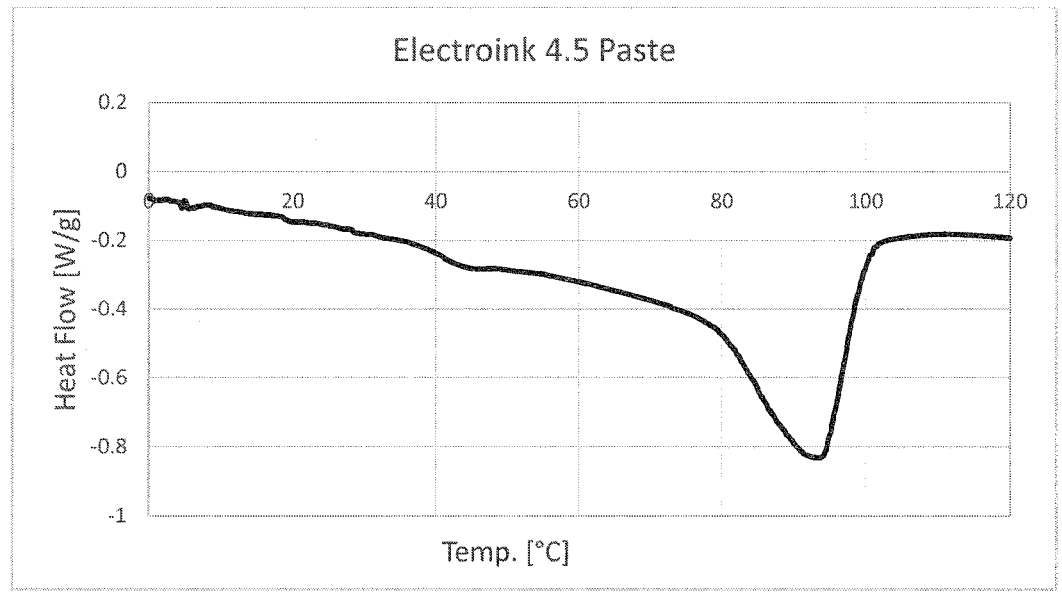
FIG. 2a is a graph showing heat flow into a sample of a first resin component across a temperature range.
Figure 2B:
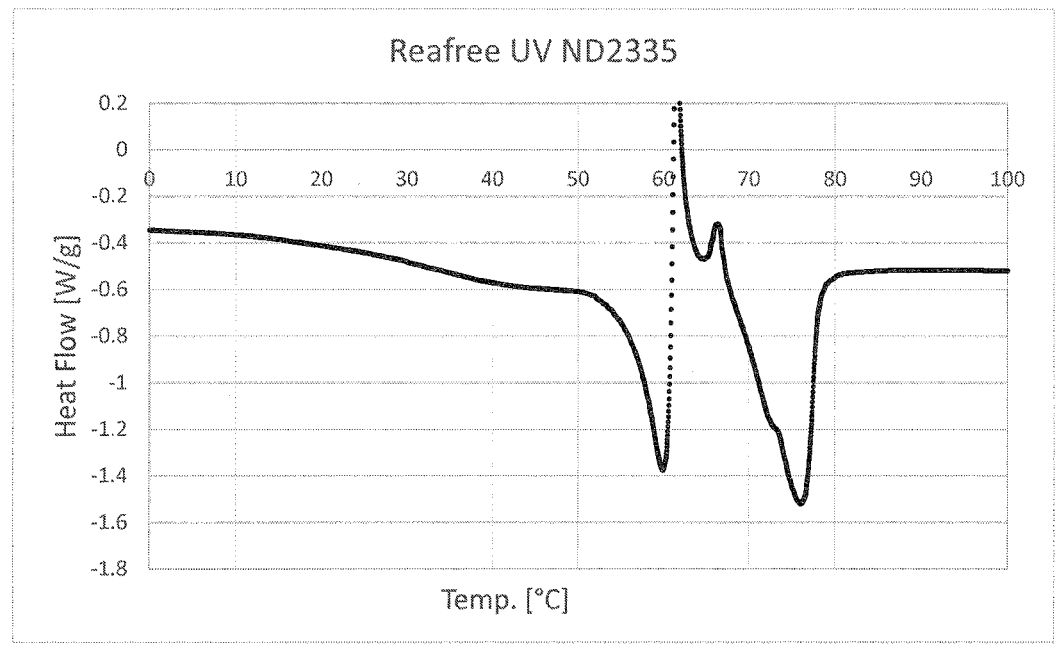
FIG. 2b is a graph showing heat flow into a sample of a second resin component across a temperature range.
Figure 2C:
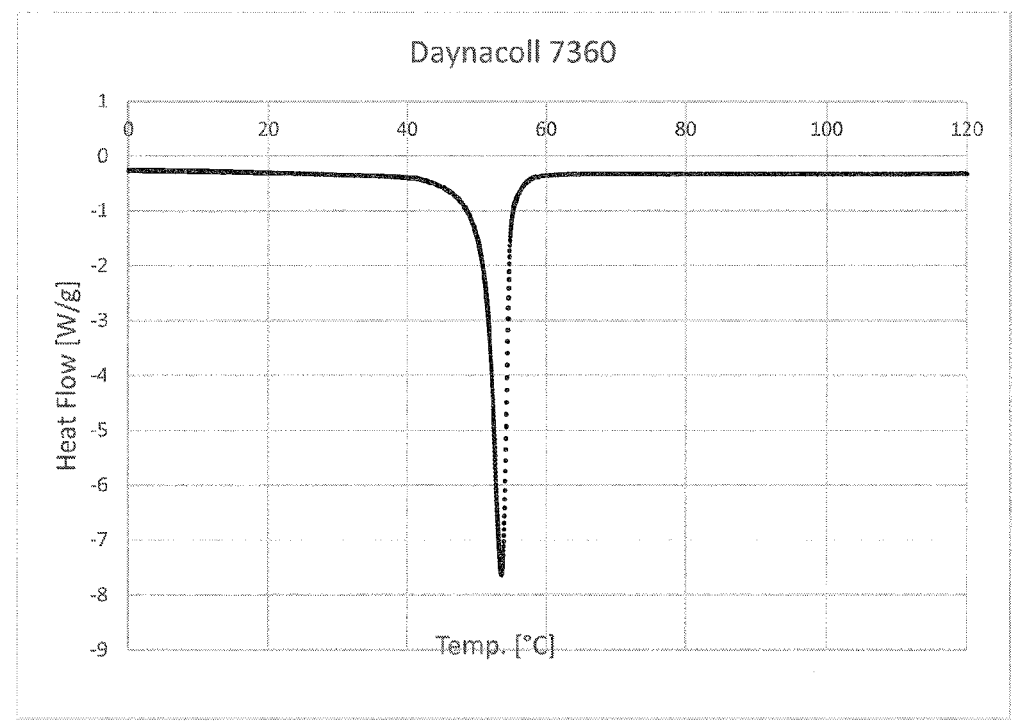
FIG. 2c is a graph showing heat flow into a sample of a second resin component across a temperature range.
Figure 2D:
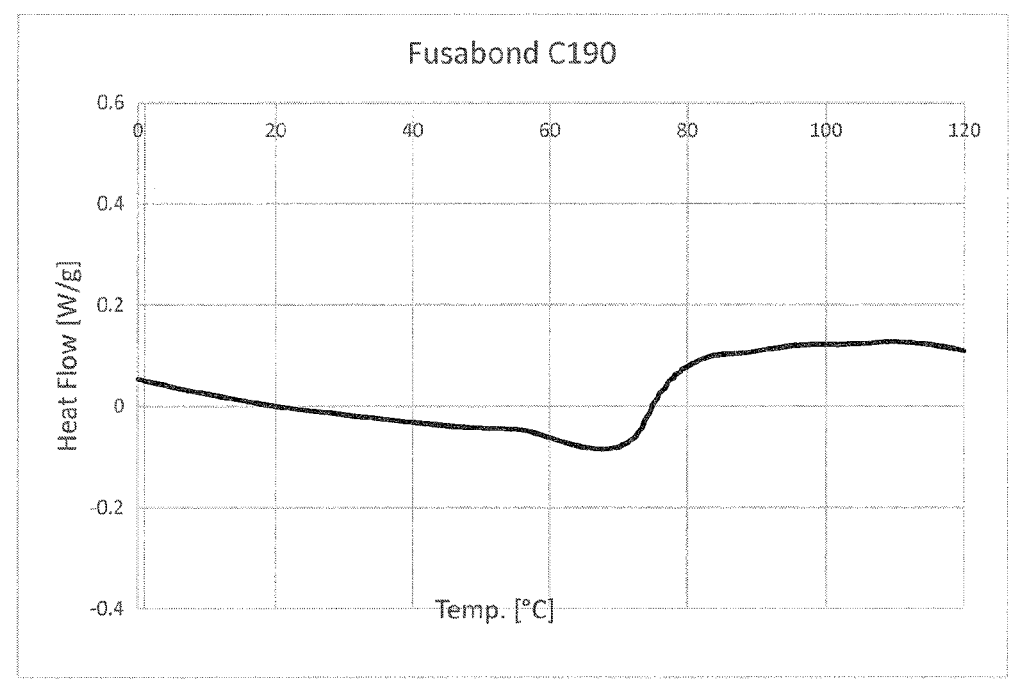
FIG. 2d is a graph showing heat flow into a sample of a second resin component across a temperature range.
Figure 2E:
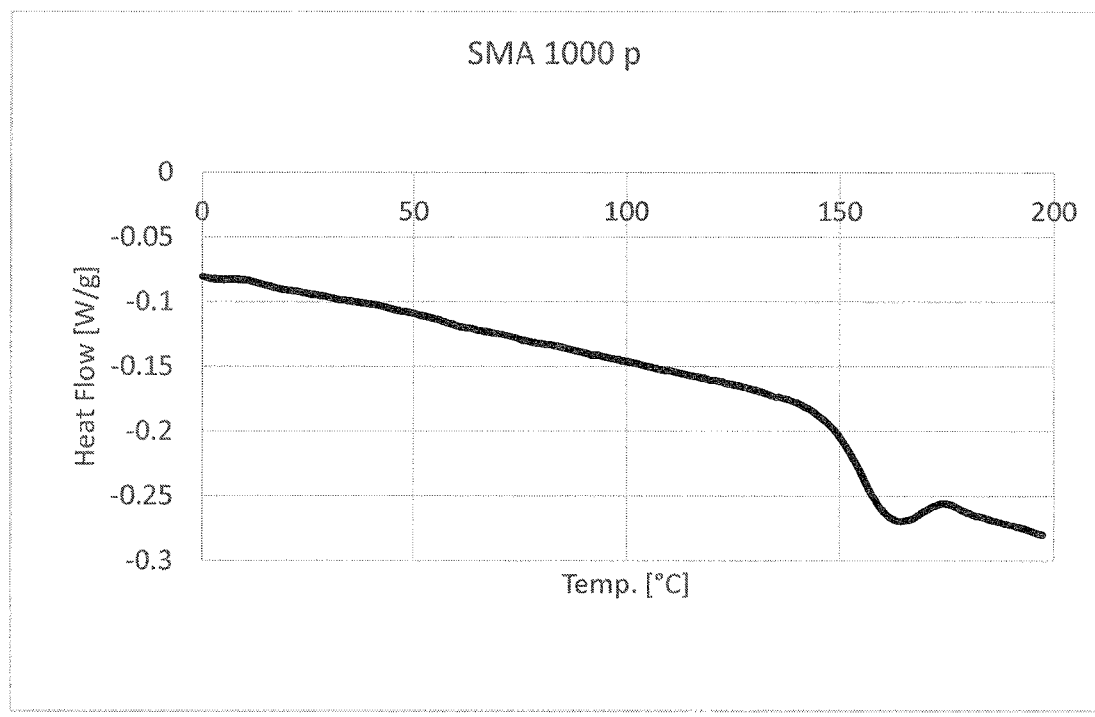
FIG. 2e is a graph showing heat flow into a sample of a second resin component across a temperature range.

FIGS. 2a-2e illustrate graphs showing the heat flow to the sample over the scanned temperature ranges for the first resin component and the second resin components used in Examples 1-5. FIG. 2a illustrates a graph showing the heat flow to an Electroink 4.5 paste (25 wt % first resin component, the first resin component being 20 wt % A-C® 5120 and 80 wt % Nucrel® 699, and 75 wt % Isopar L as a carrier liquid) sample over the scanned temperature range. FIG. 2b illustrates a graph showing the heat flow to a Reafree® UV 2335 sample over the scanned temperature range. FIG. 2c illustrates a graph showing the heat flow to a Dynacoll® 7360 sample over the scanned temperature range. FIG. 2d illustrates a graph showing the heat flow to a Fusabond® C190 sample over the scanned temperature range. FIG. 2e illustrates a graph showing the heat flow to a SMA® 1000p sample over the scanned temperature range.

Figure 3A:
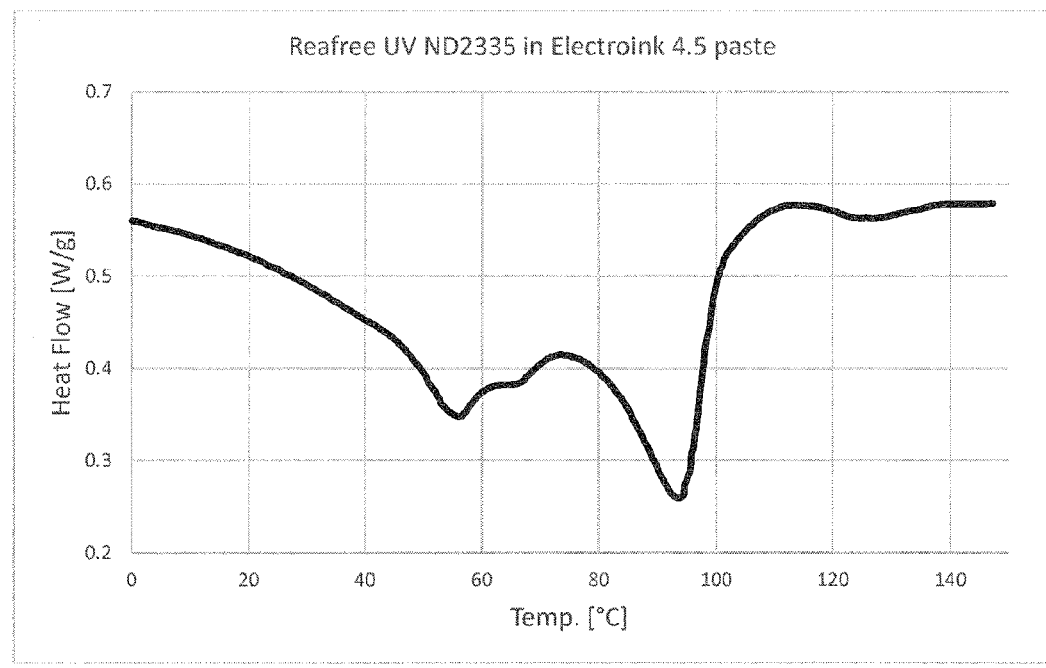
FIG. 3a is a graph showing heat flow into a sample of a LEP printing composition across a temperature range.
Figure 3B:
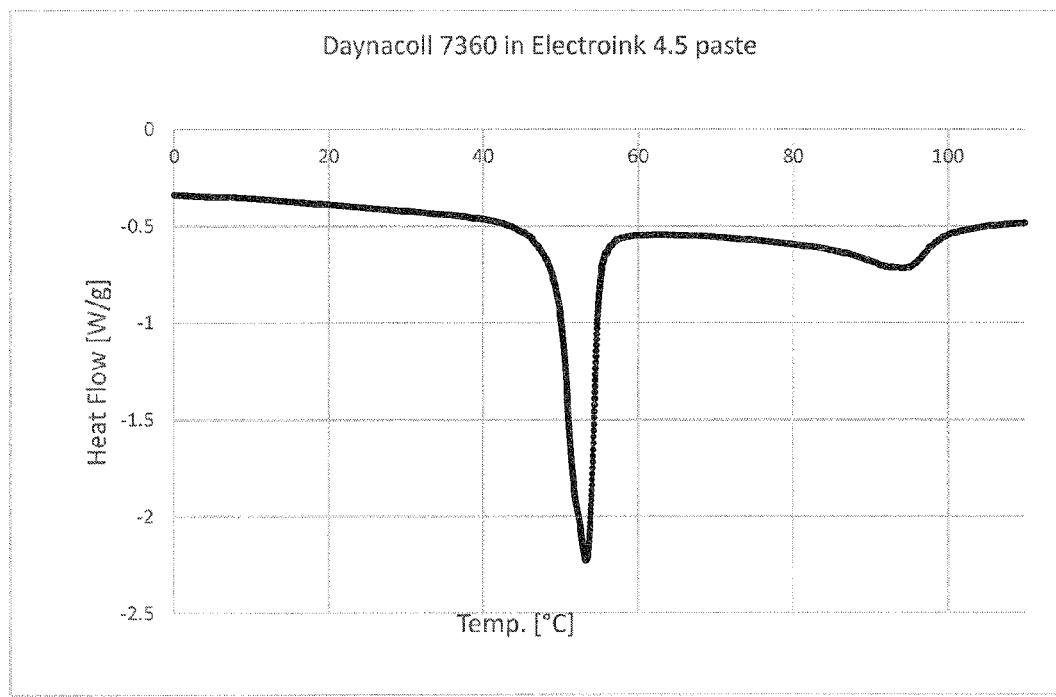
FIG. 3b is a graph showing heat flow into a sample of a LEP printing composition across a temperature range.
Figure 3C:
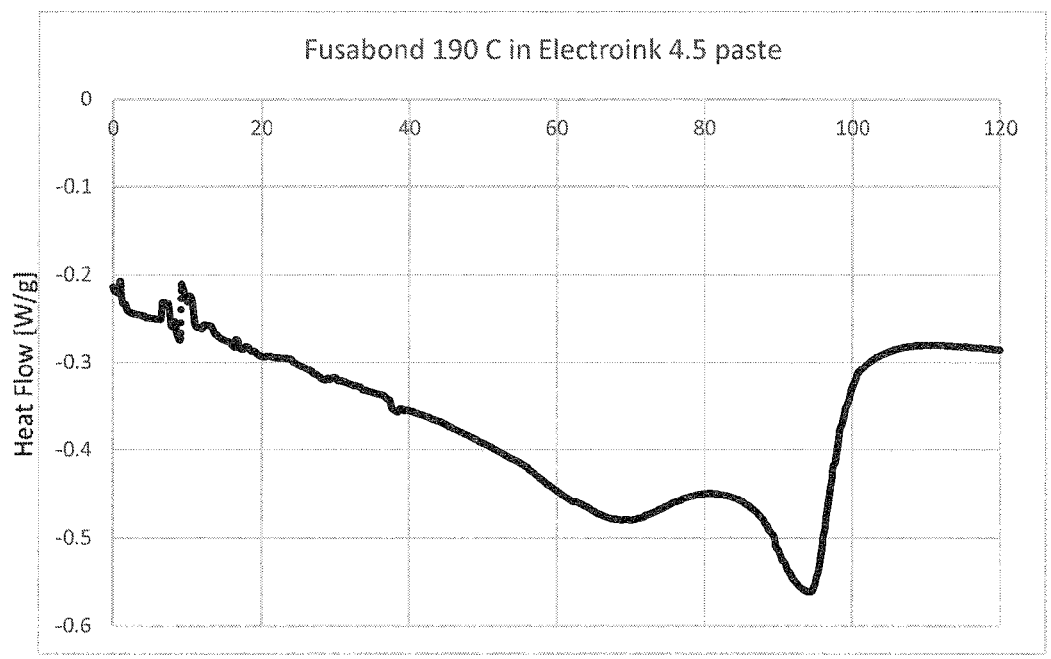
FIG. 3c is a graph showing heat flow into a sample of a LEP printing composition across a temperature range.
Figure 3D:
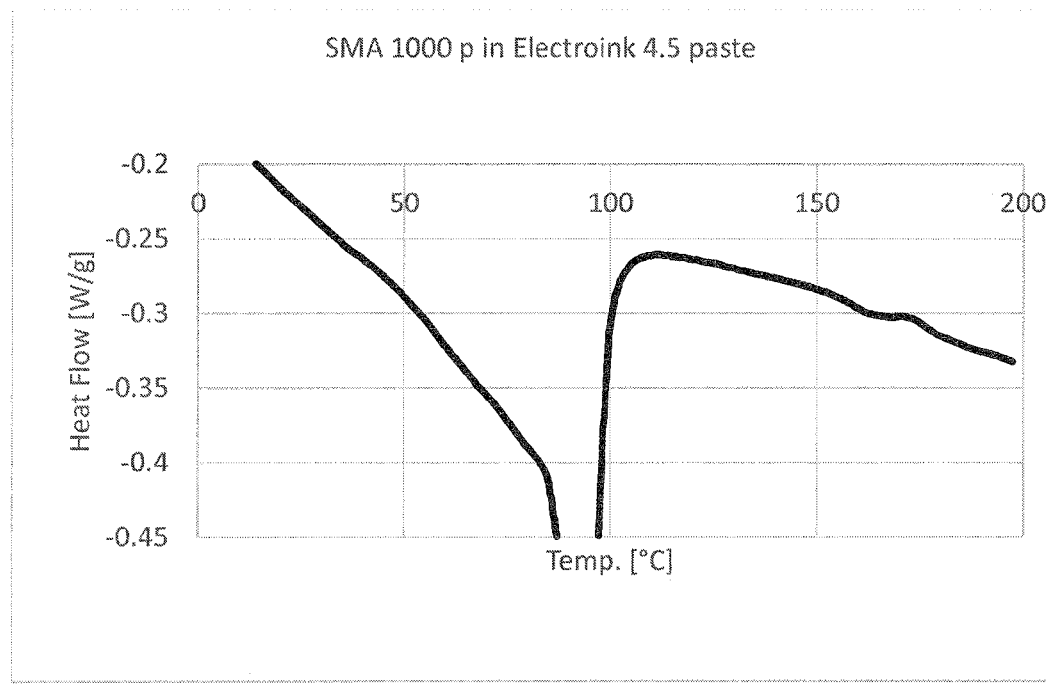
FIG. 3d is a graph showing heat flow into a sample of a LEP printing composition across a temperature range.

FIGS. 3a-3d illustrate graphs showing the heat flow to the sample over the scanned temperature ranges for LEP printing compositions comprising Electroink 4.5 paste (25 wt % first resin component, the first resin component being 20 wt % A-C® 5120 and 80 wt % Nucrel® 699, and 75 wt % Isopar L as a carrier liquid) as the first resin component and a second resin component. FIG. 3a illustrates a graph showing the heat flow to a sample of a LEP printing composition containing 61.6 g of Electroink 4.5 paste and 24 g Reafree® UV 2335 as the second resin component. FIG. 3b illustrates a graph showing the heat flow to a sample of a LEP printing composition containing 61.6 g of Electroink 4.5 paste and 24 g Dynacoll® 7360 as the second resin component. FIG. 3c illustrates a graph showing the heat flow to a sample of a LEP printing composition containing 61.6 g of Electroink 4.5 paste and 24 g Fusabond® C190 as the second resin component. FIG. 3d illustrates a graph showing the heat flow to a sample of a LEP printing composition containing 77.6 g Electroink 4.5 paste and 20 g SMA® 1000p as the second resin component.

Table 1 below shows the melting point for Electroink 4.5 paste (25 wt % first resin component, the first resin component being 20 wt % A-C® 5120 and 80 wt % Nucrel® 699, and 75 wt % Isopar L as a carrier liquid) and each of the second resin components tested alone and as part of a LEP printing composition comprising Electroink 4.5 paste as the first resin component as determined by the TA instruments Discovery model DSC. Firstly, the melting point of a sample of each of Electroink 4.5 paste, Reafree® UV ND2335 (Arkema), Dynacoll® 7360 (Evonik), Fusabond® C 190 (DuPont), and SMA® 1000p (Cray Valley) alone were determined as the temperature of the first heat flow minima over the heating range from the DSC data illustrated in FIGS. 2a-2e. Then the melting points of each of the second resin components contained in each of the LEP printing compositions were determined from the DSC data, using the melting points of each of the second resin components and the Electroink 4.5 paste shown in the first column of the table to assign melting points to the first or second resin components at heat flow minima in the data collected by DSC for the LEP printing compositions as illustrated in FIGS. 3a-3d.

The above method of determining the melting point of a resin using differential scanning calorimetry is generally applicable and can be used for all resins.

TABLE 1

| material | melting point (° C.) | melting point in Electroink 4.5 paste(° C.) |
| --- | --- | --- |
| Electroink 4.5 paste | 93 | NA |
| Reafree ® UV ND2335 (Arkema) | 60, 76 | 55.6, 66 |
| Dynacoll ® 7360 (Evonik) | 53.5 | 53.2 |
| Fusabond ® C 190 (DuPont) | 70.2 | 69 |
| SMA ® 1000p (Cray Valley) | 164.3 | 164 |

Example 6

The LEP printing composition of Example 1 was introduced into a LEP printing apparatus, in this example a HP indigo 7000 series printing system was used. The LEP printing composition of Example 1 was supplied to a BID in the LEP printing apparatus The LEP printing apparatus used in this example also contained four BID units each comprising a coloured toner reservoir, the four coloured toner reservoirs containing cyan, magenta, yellow and black coloured electrostatic inks respectively. In this example the coloured electrostatic inks used were all Electroink®4.5 inks (HP Indigo) which comprise a pigment and a first resin component containing 20 wt % A-C® 5120 and 80 wt % Nucrel® 699.

An LEP printing apparatus was used to produce a print substrate electrostatically printed with a CMYK coloured image and four layers of the LEP printing composition printed on top of the CMYK coloured image as an adhesive layer. The print substrate on which a coloured image overprinted with a LEP printing composition image was then fed to a foiling station at which a foiling material being a gold coloured film (Jolybar TD Plus Gold 4001 305 mm) was placed on the print with the back of a foiling film with the foiling material facing the print substrate. The print substrate and the foiling film with the foiling material were passed through a roll laminator (GMP, Korea) at 28 mm/sec. The rolls were heated to 75° C. at maximum machine pressure. The foil was transferred selectively to the print surface only to the areas of the LEP printing composition image. No foiling material was left on any part of the coloured image that was not overprinted with the LEP printing composition after removal of the foiling film from the print substrate. This illustrates that the LEP printing composition of Example 1 can be used as an adhesive to adhere a foiling material to selected regions of a print substrate.

Example 7

The method of Example 6 was repeated, except that the print substrate with a CMYK coloured image overprinted with the LEP printing composition image was fed to a glossing station. At the glossing station a smooth polyester metalized film (clear metal PET+PR, Hanita coatings 23 micron thick) for smoothing the melted ink was placed on the print prior to subjecting the print to pressure and heat for glossing. The print substrate was passed through using roll laminator (GMP, Korea) at 28 mm/sec. The rolls were heated to 75° C., maximum machine pressure was applied in the laminator. The smooth polyester metalized film was peeled off the substrate after cooling to room temperature leaving a glossy area on the selected areas (where the LEP printing composition was printed) on the print substrate. Gloss of the substrate was determined at 60° using "micro-Tri-gloss" (BYK Gardner Gmbh, Germany). The gloss of the LEP printing composition formed after passing through the glossing station was 55 gloss units (GU) compared the coloured toner image having a gloss of 19 GU, showing that the LEP printing composition of Example 1 can be used as a glossing composition to selectively gloss an area of an image on a print substrate.

Example 8

The method of Example 6 was repeated, except that the LEP printing composition used was the LEP printing composition of Example 2 and in the foiling station the rolls were heated to 80° C. The foiling film was peeled off the print substrate after cooling to room temperature leaving a golden foiling material image on selected areas (only areas where the LEP printing composition was printed) on the printed image. No foiling material was left on any part of the coloured images that were not overprinted with the LEP printing composition after removal of the foiling film from the print substrate. This illustrates that the LEP printing composition of Example 2 can be used as an adhesive to adhere a foiling material to selected regions of a print substrate.

Example 9

The method of Example 6 was repeated, except that the LEP printing composition used was the LEP printing composition of Example 3. The print substrate with the gold coloured film for foiling were passed through a roll laminator (GMP, Korea) at 4.5 mm/sec. The rolls were heated to 75° C., maximum machine pressure was applied in the laminator. The foiling film was peeled off the print substrate after cooling to room temperature leaving a golden foiling material image on selected areas (only areas where the LEP printing composition was printed) on the print. No foiling material was left on any part of the coloured images that were not overprinted with the LEP printing composition after removal of the foiling film from the print substrate. This illustrates that the LEP printing composition of Example 3 can be used as an adhesive to adhere a foiling material to selected regions of a print substrate.

Example 10

The method of Example 7 was repeated, except that the LEP printing composition used was the LEP printing composition of Example 4.

The smoothing film was peeled off the print substrate after cooling to room temperature leaving a glossy area on the selected areas (where the LEP printing composition was printed) on the print. Gloss of the substrate was determined at 60° using "micro-Tri-gloss" (BYK Gardner Gmbh, Germany). The LEP printing composition image was determined to have a gloss of 35.4 GU compared to the coloured toner image having a gloss of 16.4 GU, showing that the LEP printing composition of Example 4 can be used as a glossing composition to selectively gloss an area of an image on a print substrate.

Example 11

The method of Example 7 was repeated, except that the LEP printing composition used was the LEP printing composition of Example 5 and only one layer of the LEP printing composition was printed on top of the coloured toner image.

The smoothing film was peeled off the print substrate after cooling to room temperature leaving a gloss inhibited (i.e. matt) area on the selected areas (where the LEP printing composition was printed) on the print. Gloss of the substrate was determined at 60° using "micro-Tri-gloss" (BYK Gardner Gmbh, Germany). The LEP printing composition image was determined to have a gloss of 13.4 GU compared to the coloured toner image having a gloss of 25.2 GU, showing that the LEP printing composition of Example 5 can be used as a gloss inhibiting (or matt) LEP printing composition to selectively inhibit the formation of a gloss image on an area of an image on a print substrate or selectively print a matt image.

Examples 6-11 above illustrate that the LEP printing compositions described herein may be be used as a selective adhesive LEP printing compositions, selective glossing LEP printing compositions or selective gloss inhibiting LEP printing compositions.

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims or any and/or any of the independent claims.

The invention claimed is:

1. A liquid electro photographic (LEP) printing composition comprising:
   a first resin component comprising an ethylene acrylic acid resin, an ethylene methacrylic acid resin or combinations thereof; and
   a second resin component present in an amount of about 20% to about 80% by weight of total solids content of the composition, the second resin component having a melting point of from about 50° C. to about 75° C., which is below the melting point of the first resin component, or from about 140° C. to about 180° C., which is above the melting point of the first resin component.

2. A LEP printing composition according to claim 1, wherein the second resin component has a melting point from about 50° C. to about 70° C.

3. A LEP printing composition according to claim 1, wherein the second resin component is present in an amount of at least 40% by weight of total solids content of the composition.

4. A LEP printing composition according to claim 1 further comprising a carrier liquid and the first and second resin components are dispersed in the carrier liquid.

5. A LEP printing composition according to claim 4, wherein the second resin component has a swelling index of less than 20% in the carrier liquid.

6. A LEP printing composition according to claim 1, wherein the first resin component has a melting point from about 80° C. to about 120° C.

7. A LEP printing composition according to claim 1, wherein the first resin component has a melting point from about 90° C. to about 110° C.

8. A LEP printing composition according to claim 1, wherein the composition is transparent.

9. A LEP printing composition according to claim 1, wherein the second resin component is a resin selected from an urethane acrylate, a copolyester, an ethylene vinyl acetate copolymer and a styrene maleic anhydride copolymer.

10. A LEP printing composition according to claim 1, wherein the first resin component comprises an ethylene acrylic acid resin and an ethylene methacrylic acid resin.

11. A method of producing a liquid electro photographic (LEP) printing composition comprising combining a carrier liquid, a first resin component comprising an ethylene acrylic acid resin, an ethylene methacrylic acid resin or combinations thereof, and about 20% to about 80% by weight of total solids content of the composition of a second resin component having a melting point of from about 50° C. to about 75° C., which is below the melting point of the first resin component, or from about 140° C. to about 180° C., which is above the melting point of the first resin component.

12. A method of electrophotographic printing a liquid electro photographic (LEP) printing composition, the composition comprising:

a first resin component comprising an ethylene acrylic acid resin, an ethylene methacrylic acid resin or combinations thereof;

a second resin component present in an amount of about 20% to about 80% by weight of total solids content of the composition, the second resin component having a melting point of from about 50° C. to about 75° C., which is below the melting point of the first resin component, or from about 140° C. to about 180° C., which is above the melting point of the first resin component; and a carrier liquid, wherein the method comprises:
  forming a latent electrostatic image on a surface;
  contacting the surface with the LEP printing composition such that at least some of the LEP printing composition adheres to the surface to form an image on the surface; and
  transferring the image to a print substrate.

13. A method of electrophotographic printing according to claim 12 further comprising heating the print substrate to at least partially melt the first resin component or the second resin component of the LEP printing composition without melting the other of the first resin component or the second resin component to form a partially molten image on the print substrate.

14. A method of electrophotographic printing according to claim 13 further comprising applying pressure to the partially molten image on the print substrate to form a glossed image on the print substrate.

15. A method of electrophotographic printing according to claim 13 further comprising applying pressure and a foiling material to the partially molten image on the print substrate such that the foiling material adheres to the partially molten image to form a foiled image on the print substrate.

* * * * *

UNITED STATES PATENT AND TRADEMARK OFFICE
CERTIFICATE OF CORRECTION

PATENT NO. : 9,857,717 B2
APPLICATION NO. : 15/541165
DATED : January 2, 2018
INVENTOR(S) : Hannoch Ron et al.

Page 1 of 1

It is certified that error appears in the above-identified patent and that said Letters Patent is hereby corrected as shown below:

On the Title Page

In item (56), under US Patent Documents, in Column 2, Line 6, delete "Van Goethern et al." and insert -- Van Goethem et al. --, therefor.

In item (56), other publication, in Column 2, Line 1, delete "Dynacol" and insert -- Dynacoll --, therefor.

In the Drawings

In Fig. 2c, sheet 3 of 6, Line 1, delete "Daynacoll" and insert -- Dynacoll --, therefor.

In Fig. 3b, sheet 5 of 6, Line 1, delete "Daynacoll" and insert -- Dynacoll --, therefor.

Signed and Sealed this
Tenth Day of July, 2018

Andrei Iancu
*Director of the United States Patent and Trademark Office*